United States Patent [19]

Kosuga

[11] Patent Number: 5,239,697
[45] Date of Patent: Aug. 24, 1993

[54] RADIO RECEIVER WITH TWO RECEIVING SYSTEMS

[75] Inventor: Tadashi Kosuga, Saitama, Japan

[73] Assignee: Pioneer Electronic Corporation, Tokyo, Japan

[21] Appl. No.: 616,959

[22] Filed: Nov. 21, 1990

[30] Foreign Application Priority Data

Apr. 12, 1990 [JP] Japan .................... 2-95186

[51] Int. Cl.⁵ ............................. H04B 1/26
[52] U.S. Cl. ...................... 455/133; 455/189.1; 455/315
[58] Field of Search .............. 455/132–136, 455/277, 188, 189, 314, 315, 345, 277.1, 188.1, 189.1

[56] References Cited

U.S. PATENT DOCUMENTS

| | | | |
|---|---|---|---|
| 4,317,218 | 2/1982 | Perry | 455/133 |
| 4,521,916 | 6/1985 | Wine | 455/260 |
| 4,688,264 | 8/1987 | Miura | 455/134 |
| 4,742,563 | 5/1988 | Fukumura | 455/134 |
| 4,912,775 | 3/1990 | Matsuura | 455/189 |
| 4,926,498 | 5/1990 | Suzuki et al. | 455/133 |
| 4,932,072 | 6/1990 | Toko | 455/183 |
| 5,010,400 | 4/1991 | Oto | 455/189 |

FOREIGN PATENT DOCUMENTS

| | | | |
|---|---|---|---|
| 56-125122 | 10/1981 | Japan | 455/133 |
| 57-97732 | 6/1982 | Japan | 455/521 |
| 61-65536 | 4/1986 | Japan | 455/133 |
| 2-149134 | 6/1990 | Japan | 455/133 |

*Primary Examiner*—Reinhard J. Eisenzopf
*Assistant Examiner*—Edward Urban
*Attorney, Agent, or Firm*—Sughrue, Mion, Zinn, Macpeak & Seas

[57] ABSTRACT

A radio receiver with two receiving systems includes a CPU for selecting the appropriate ranges of local signal generators in the two receiving systems so that local signals generated by the local signal generators do not fall into the frequency range of a received RF signal.

4 Claims, 3 Drawing Sheets

RADIO RECEIVER WITH TWO RECEIVING SYSTEMS

FIELD OF THE INVENTION

The present invention relates to a radio receiver of the twin tuner type which has two parallel receiving systems.

BACKGROUND OF THE INVENTION

In recent days, an RDS (radio data system) broadcasting system has come into use in European countries. A network follow system has been known as one of the services provided by the RDS broadcasting system.

In the network follow system, frequency data (AF) of a broadcasting station broadcasting a program is contained in the RDS data. AF stands for Alternative Frequencies and relates to data for indicating the frequencies of stations broadcasting the same program in circumferential areas. A receiver writes the data of the necessary AF list into a memory installed therein. When a tuning operation is carried out, the AF data is read out of the memory and signal levels of the AF frequencies are checked by a conventional method, i.e., detecting the strength of the electric field. When a signal level of a broadcasting frequency being currently received is below a preset level, the receiver checks signal levels of the AF frequencies, and selects a broadcasting frequency that can be received with better receive quality than the present one, and uses that frequency for receiving the program.

In this way, the channel select operation that will frequently occur in the mobile radio communications environment, is automatically carried out, so that a particular program can always be received in the best condition.

To take advantage of such a service, in the case of a single FM receiving system, muting is applied to a broadcasting station that is presently subjected to the audio monitor, for a short time. During this muting period, the receiver searches another broadcasting station in the same network. If a radio wave with respect to a new broadcasting station as searched can be received with better receive quality, the receiver uses the radio wave of the new station for receiving the program.

To check whether or not the searched station is contained in the same network, it takes some time. Therefore, in the case of a receiver with a single receiving system, it is inevitable that the sound reproduction is temporarily stopped.

To cope with this problem, a radio receiver provided with two receiving tuner systems is proposed.

This type of radio receiver is operable in such a way that a first tuner is used for the audio monitor, while a second tuner is used for searching the best channel. To be more exact, when a-receive quality in the first tuner is better than that in the second tuner, the receiver is instantaneously switched to the channel of the highest receiving quality. Thus, the receiver can get the service of the same network without the unnatural feelings provided to listeners based on the temporary muting periods described above.

Use of the two tuners together creates another problem to be discussed below.

Generally, a superheterodyne system is employed for these types of receivers. In the superheterodyne receiver, if a high local frequency, for example, is used for a local signal, generated by a local oscillator, a local signal of the first receiver whose frequency is the receiving frequency plus 10.7 MHz, may fall within the frequency band of the received RF signal of the second receiver. Also, the reverse case may exist i.e., a local signal of the second receiver falls within the frequency band of a received RF signal of the first receiver. This results in negatively affecting the receiving band of the other receiver.

To cope with this problem, it is conceivable that the double superheterodyne system is used for the receivers.

FIG. 3 is a block diagram showing a basic arrangement of a twin tuner of a double superheterodyne system. An RF signal received by an antenna 1 is properly amplified by RF amplifiers 2 and 3, and then applied to mixers 4 and 5. The mixers receive respectively local signals from local oscillators 6 and 7, and produce first intermediate frequency (IF) signals. The produced signals are amplified by IF signal amplifiers 8 and 9, and then applied to mixers 10 and 11, respectively. The mixers 10 and 11, which now receive the amplified IF signals, receive local signals from local oscillators 12 and 13, and convert the first IF signals into second IF signals, respectively.

The second IF frequency signals are demodulated by detector circuits 14 and 15, and output from output terminals 16 and 17, respectively.

In the receiver thus arranged, an oscillating frequency of each local oscillator 6 and 7 is selected to be at least about, for example, 20 MHz, higher than the frequency of the received RF signal. The first IF signal as produced using the first local signal is mixed with a second local signal generated by local oscillators 12 and 13 to thereby form an IF signal of 10.7 MHz. As a result, the frequency of the local signal will never fall within the frequency band of the received RF signal. Hence, it can be avoided that the local signal of the first receiver negatively affects the received RF frequency band of the second receiver.

As described above, if the radio receiver of the twin tuner type is designed so as to be free from local signal interference, the double superheterodyne system must be employed for both of the receivers.

When compared with the receiver using two single superheterodyne receiving systems, the receiver using the two double superheterodyne receiving systems needs additionally the mixers 10 and 11 and the local oscillators 12 and 13. This leads to an increase in manufacturing costs and makes the circuit arrangement complicated.

SUMMARY OF THE INVENTION

The present invention has an object to provide a radio receiver which is free from the increased cost and complicated circuit arrangement discussed above.

To achieve the above object, there is provided a radio receiver comprising: a first receiver of the double superheterodyne type including a first mixer for applying a first local signal to a received RF signal, a second mixer for applying a second local signal to a first intermediate frequency signal as produced by the first mixer, and a first detector circuit for demodulating a second intermediate frequency signal as produced by the second mixer; and a second receiver of the single superheterodyne type including a third mixer for applying a third local signal to the received RF signal, and a second detector circuit for demodulating a third intermediate frequency signal as produced by the third mixer, wherein a single RF receiving frequency band is divided into at least two frequency ranges, a first frequency range and a second frequency range, and a demodulated output signal of the first receiver or that of the second receiver is selected according to the first and second frequency ranges.

The radio receiver is arranged such that a single receiving frequency band is divided into at least two frequency ranges, a first frequency range and a second frequency range, and a demodulated output signal of the first receiver or that of the second receiver is selected according to the first and second frequency ranges. With such an arrangement, the first local signal in the first receiver will never enter into the frequency band of the received signal in the second receiver. The local signal in the second receiver will never enter into the frequency band of the received signal in the first receiver. The problem of the local signal of one receiver negatively affecting the received RF frequency band of another receiver is successfully solved.

BRIEF DESCRIPTION OF THE DRAWINGS

The present invention will be more clearly understood from the following description in conjunction with the accompanying drawings, wherein.

DETAILED DESCRIPTION OF THE PREFERRED EMBODIMENT

A preferred embodiment of the present invention will be described with reference to the accompanying drawings.

Figure 1:
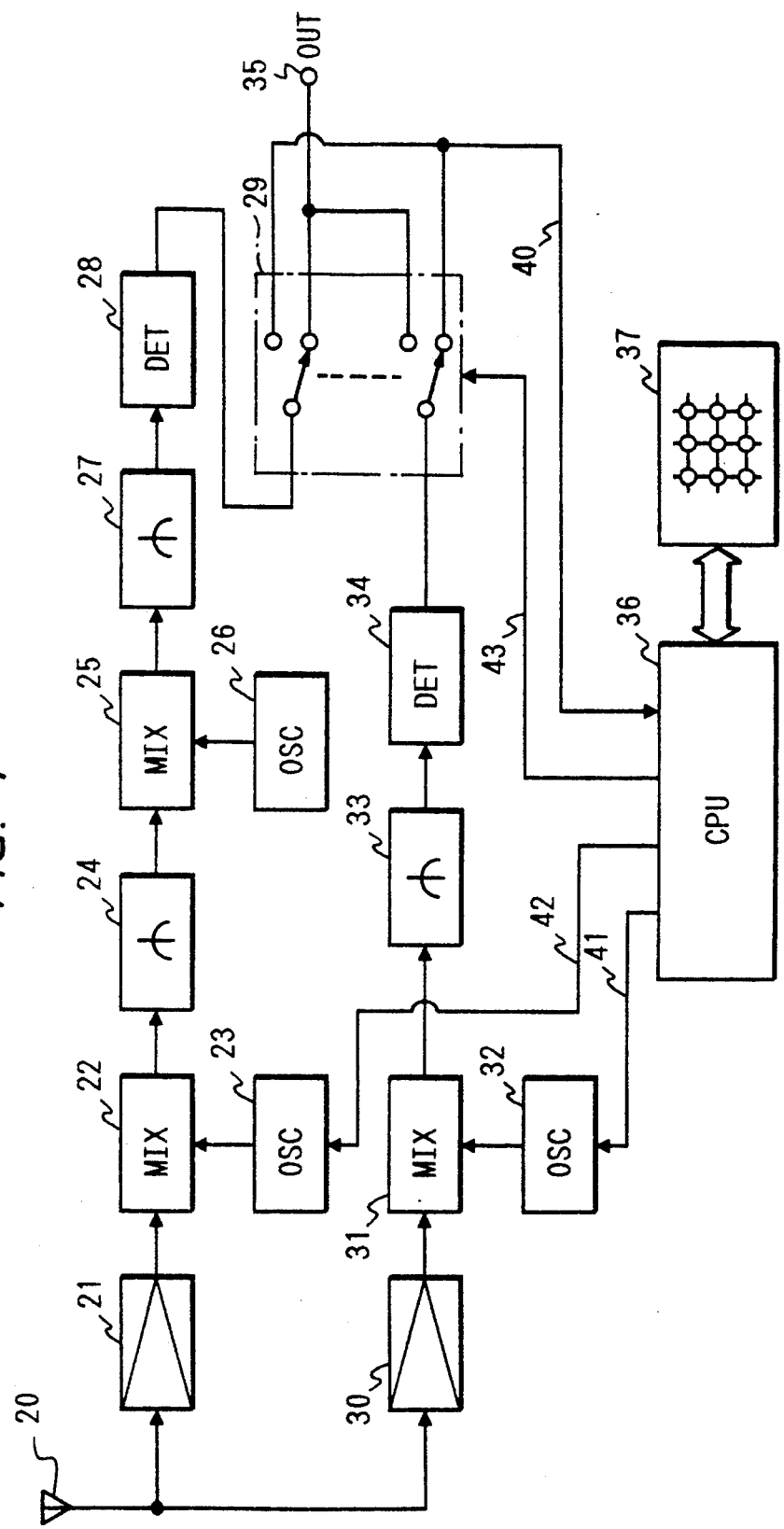
FIG. 1 is a block diagram showing an embodiment of a radio receiver according to the present invention.

FIG. 1 is a block diagram showing an embodiment of a radio receiver according to the present invention. In the figure, reference numeral 20 designates an antenna. An RF signal derived from the antenna 20 is applied to an RF amplifier 21 in a first receiving system or receiver of the double superheterodyne type. The RF signal is amplified by the amplifier 21 and then applied to a mixer 22.

The mixer 22 is coupled with a local oscillator 23. The RF signal is mixed with a local signal generated by the local oscillator 23, and converted into a first intermediate frequency signal. The first IF signal is amplified by an IF amplifier 24, and then applied to a mixer 25.

The mixer 25 is coupled with a local oscillator 26. The first IF signal is mixed with a local signal generated by the local oscillator 26, and converted into a second intermediate frequency signal.

The second IF signal is selectively amplified by an IF amplifier 27, and then applied to a detector circuit 28. Then, it is demodulated by the detector circuit 28, and applied to a selector 29.

The RF signal derived from the antenna 20 is applied to an RF amplifier 30 in a second receiving system or receiver of the single superheterodyne type. The RF signal is amplified by the amplifier 30 and then applied to a mixer 31.

The mixer 31 is coupled with a local oscillator 32. The RF signal is mixed with a local signal as generated by the local oscillator 32, and converted into an IF signal. This IF signal is amplified by an IF amplifier 33, and then applied to a detector circuit 34. Then, it is demodulated by the detector circuit 34, and applied to the selector 29.

The selector 29 selects the demodulated signal of the first receiver or that of the second receiver. The demodulated audio signal as selected is applied to an output terminal 35.

The non-selected audio signal is applied to a central processing unit (CPU 36) along line 40 as a demodulation control signal. The CPU 36 fetches frequency data (AF) of a broadcasting station which broadcasts a program as one of the services performed by the RDS broadcasting system as described above.

The CPU 36 is coupled with a keyboard 37 for entering instructions, such as a channel selection. In response to the instructions entered from the keyboard 37, the CPU 36 produces local signal control signals along lines 41 and 42 which are to be applied, respectively, to the local oscillators 32 and 23 of the first and second receivers, respectively.

In the radio receiver thus arranged, if the receiving frequency band is an FM band of 87.50 to 108.00 MHz, the frequency of the local signal generated by the local oscillator 23 ranges from 108.90 to 129.40 MHz, in the first receiver of the double superheterodyne type. Then, the frequency of the first IF signal is 21.4 MHz.

The first IF signal of 21.40 MHz is mixed with the local signal of frequency 32.1 MHz from the local oscillator 26, and converted into an IF signal of 10.7 MHz, which in turn is demodulated by the detector circuit 28.

In the second receiver of the single superheterodyne type, the frequency of the local signal as generated by the local oscillator 32 is set between 98.20 MHz and 118.70 MHz. The frequency of the resultant IF signal is 10.70 MHz.

The IF signal is demodulated by the detector circuit 34.

In the radio receiver, the received frequency band is divided into at least two frequency bands, a first frequency band and a second frequency band. The first and second receivers receive and demodulate the signals within the first and second frequency bands, respectively.

If the FM receiving frequency band is between 87.50 MHz and 108.00 MHz as mentioned above, it is divided into a low frequency band of 87.50 to 97.75 MHz and a high frequency band of 97.80 to 108.00 MHz.

Let us define the tuner that produces an audio demodulated signal, corresponding to a broadcasting program, as a main tuner, and the tuner that produces a data demodulated signal, corresponding to the data for RDS including the AF data, as a sub tuner. The selector 29 selects the demodulated signal of the first receiver (double superheterodyne receiver) or that of the second receiver (single superheterodyne receiver) to be output onto terminal 35 according to the receiving frequency of the main tuner.

More specifically, when the receiving frequency of the main tuner belongs to the low frequency band (87.50 to 97.75 MHz), the first receiver is used for the main tuner, and the second receiver, for the sub tuner.

When the receiving frequency of the main tuner belongs to the high frequency band (97.80 to 108.00

MHz), the second receiver is used for the main tuner, and the first receiver, for the sub tuner.

The above switchings are carried out by the CPU 36. That is, the CPU 36 controls the selector 29 along line 43 in such a way that when the receiving frequency falls within the low frequency band, as indicated to the CPU 36 by the keyboard 37, the movable contacts of the selector 29 are turned to the fixed contacts shown in FIG. 1, and when it falls within the high frequency band, the selector is turned to the other fixed contacts.

Figure 2:
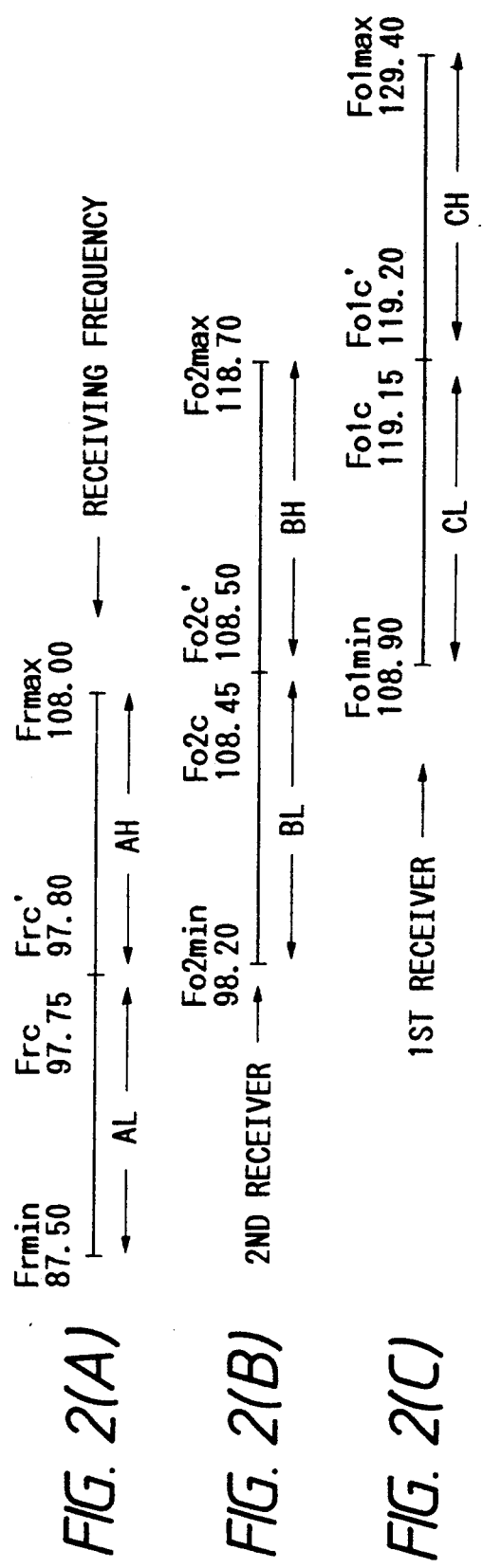
FIGS. 2(A) through 2(C) are diagrams showing frequency allocations useful in explaining the operations of the radio receiver of FIG. 1.
Figure 3:
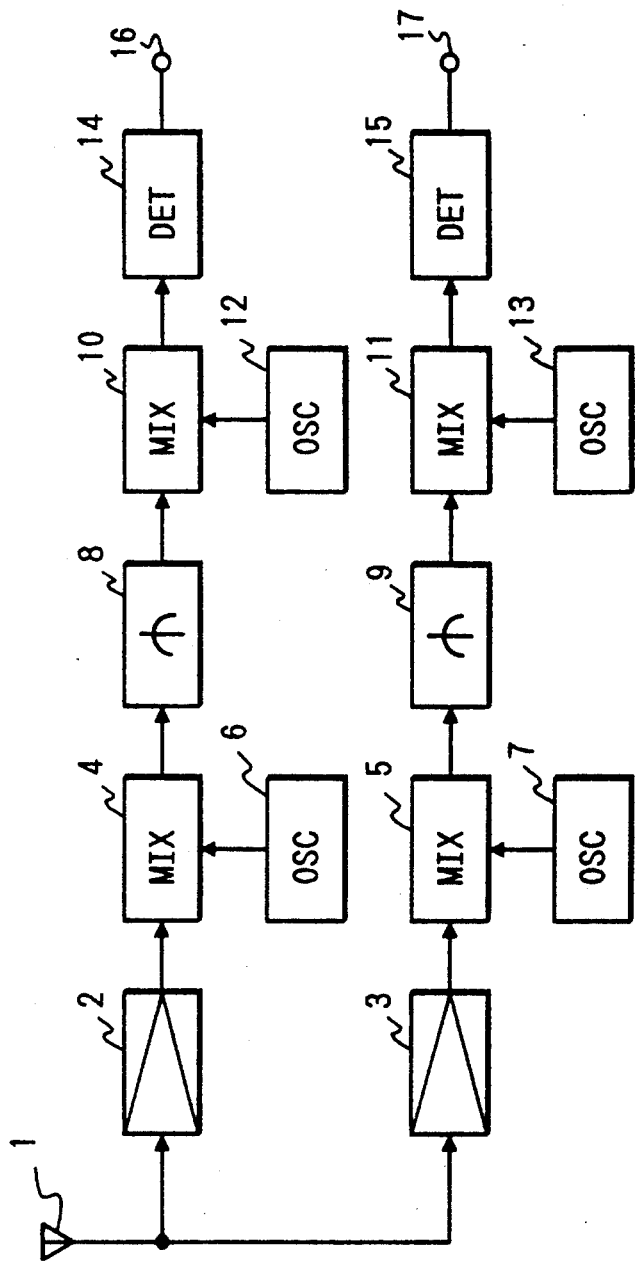
FIG. 3 is a block diagram showing a basic arrangement of a twin tuner of the double superheterodyne system.

FIGS. 2(A) through 2(C) are diagrams showing the operations as mentioned above. FIG. 2(A) shows a receiving frequency band of the radio receiver. As shown, the low frequency band ranges from Frmin (87.50 MHz) to Frc (97.75 MHz), and the high frequency band ranges from Frc' (97.80 MHz) to Frmax (108.00 MHz).

In the second receiver, as shown in FIG. 2(B), the low frequency band of the local signal ranges from Fo2min (98.20 MHz) to Fo2c (108.45 MHz), and the high frequency band ranges from Fo2c' (108.50 MHz) to Fo2max (118.7 MHz).

In the first receiver, as shown in FIG. 2(C), the low frequency band of the local signal ranges from Fo1min (108.90 MHz) to Fo1c (119.15 MHz), and the high frequency band ranges from Fo1c' (119.20 MHz) to Fo1max (129.40 MHz).

As described above, to receive a signal within the low frequency band (AL in FIG. 2(A)), the first receiver is used as the main tuner, and the frequency of the local signal is within the range of CL in FIG. 2(C). When the second receiver is used as the sub tuner, the frequency of the local signal is within the range of BL in FIG. 2(B). Accordingly, neither the local signal of the first receiver nor that of the second receiver will be coincident with the receiving frequency in the low frequency band, and hence the local signals will not negatively affect the received RF signal.

To receive a signal within the high frequency band (AH in FIG. 2(A)), the second receiver is used as the main tuner, and the frequency of the local signal is within the range of BH in FIG. 2(B). When the first receiver is used as the sub tuner, the frequency of the local signal is within the range of CH in FIG. 2(C). Accordingly, neither the local signal of the first receiver nor that of the second receiver will be coincident with the receive frequency in the high frequency band, and hence the local signals will not negatively affect the received RF signal.

As seen from the foregoing description, the radio receiver of the invention is arranged such that a single receiving frequency band is divided into at least two frequency ranges, a first frequency range and a second frequency range, and a demodulated output signal of the first receiver or that of the second receiver is selected according to whether the received signal is of the first or the second frequency ranges. With such an arrangement, the first local signal will never enter into the frequency band of the received signal of the second receiver. The second local signal will, correspondingly, never enter into the frequency band of the received signal of the first receiver. The problem of the local signal of one receiver negatively affecting the received RF signal of another receiver is successfully solved.

Further, it is noted that one of the receivers is of the double superheterodyne type, and the other is of the single superheterodyne type. The radio receiver of the invention is lower in cost and simpler in circuit arrangement than the conventional radio receiver in which both the receivers must be of the double superheterodyne type.

In the description as given above, the network follower using the AF data containing in the RDS data is used as an example. It is evident, however, that the present invention is applicable for another type of radio receiver with a function to monitor the quality and content of the broadcasting wave.

What is claimed is:

1. A radio receiver apparatus comprising:
   a first receiver of the double superheterodyne type including a first mixer for applying a first local oscillator signal to a received RF signal so as to output a first intermediate frequency signal, a second mixer for applying a second local oscillator signal to said first intermediate frequency signal so as to output a second intermediate frequency signal, and a first detector circuit for demodulating said second intermediate frequency signal; and
   a second receiver of the single superheterodyne type including a third mixer for applying a third local oscillator signal to the received RF signal so as to output a third intermediate frequency signal, and a second detector circuit for demodulating said third intermediate frequency signal,
   wherein a single receiving frequency band is divided into at least two frequency ranges, a first frequency range and a second frequency range, and a demodulated output signal of said first receiver or that of said second receiver is selected by a user-controlled selecting means depending upon whether said received RF signal is in said first or said second range.

2. A radio receiver apparatus as claimed in claim 1 wherein said selecting means is a CPU.

3. A radio receiver apparatus as claimed in claim 2 wherein said selecting means receives an input from a keyboard.

4. A radio receiver apparatus as claimed in claim 1 wherein said apparatus is a network follow system.

* * * * *